US007647764B2

United States Patent
Plote et al.

(10) Patent No.: US 7,647,764 B2
(45) Date of Patent: Jan. 19, 2010

(54) METHOD AND DEVICE FOR DETERMINING A TEMPERATURE VARIABLE

(75) Inventors: Holger Plote, Ennsdorf (AT); Andreas Krautter, Steinheim (DE); Michael Walter, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 781 days.

(21) Appl. No.: 10/468,662

(22) PCT Filed: Feb. 9, 2002

(86) PCT No.: PCT/DE02/00479

§ 371 (c)(1),
(2), (4) Date: Jan. 23, 2004

(87) PCT Pub. No.: WO02/066803

PCT Pub. Date: Aug. 29, 2002

(65) Prior Publication Data

US 2006/0059893 A1   Mar. 23, 2006

(30) Foreign Application Priority Data

Feb. 21, 2001   (DE) ................. 101 08 182

(51) Int. Cl.
*F01N 3/00*   (2006.01)

(52) U.S. Cl. .............. 60/274; 60/277; 60/285; 60/311; 73/114.71; 73/114.75

(58) Field of Classification Search ........... 60/282, 60/277, 285, 274, 286, 295, 311; 73/118.1, 73/114.69, 114.71, 114.75

See application file for complete search history.

(56) References Cited

U.S. PATENT DOCUMENTS

| 5,067,973 | A | * | 11/1991 | Pattas ........................... 95/12 |
| 5,133,184 | A | * | 7/1992 | Geiger ....................... 60/274 |
| 5,177,463 | A | * | 1/1993 | Bradshaw et al. ........... 340/438 |
| 5,319,930 | A | * | 6/1994 | Shinzawa et al. ............ 60/286 |
| 5,379,586 | A | * | 1/1995 | Honji et al. ................... 60/276 |
| 5,592,815 | A | * | 1/1997 | Jelden et al. ................. 60/274 |
| 5,600,948 | A | * | 2/1997 | Nakajima et al. ............. 60/276 |
| 5,930,993 | A | * | 8/1999 | Kammann et al. ............ 60/274 |
| 5,938,715 | A | * | 8/1999 | Zhang et al. ................. 701/109 |
| 5,941,067 | A | * | 8/1999 | Hirota et al. .................. 60/286 |
| 6,145,302 | A | * | 11/2000 | Zhang et al. ................. 60/274 |
| 6,651,422 | B1 | * | 11/2003 | LeGare ........................ 60/277 |
| 6,691,507 | B1 | * | 2/2004 | Meyer et al. ................. 60/285 |

FOREIGN PATENT DOCUMENTS

| DE | 43 38 342 | 5/1995 |
| DE | 195 06 983 | 1/1996 |
| DE | 197 14 293 | 9/1998 |
| DE | 198 36 955 | 3/2000 |
| DE | 199 06 287 | 8/2000 |
| DE | 199 07 382 | 8/2000 |
| EP | 0 626 507 | 11/1994 |
| EP | 0 756 071 | 1/1997 |
| EP | 0 978 640 | 2/2000 |
| EP | 0 756 071 | 10/2001 |

* cited by examiner

*Primary Examiner*—Binh Q Tran
(74) *Attorney, Agent, or Firm*—Kenyon & Kenyon LLP

(57) ABSTRACT

A device and method for determining a temperature variable, in particular a temperature variable that characterizes the condition of an exhaust-gas treatment system of a combustion engine, are described. The temperature is specified on the basis of variables that characterize the mass flow in the exhaust-gas treatment system, and/or of a second temperature variable that characterizes the temperature upstream from the exhaust-gas treatment system.

5 Claims, 3 Drawing Sheets

METHOD AND DEVICE FOR DETERMINING A TEMPERATURE VARIABLE

FIELD OF THE INVENTION

The present invention relates to a method and a device for determining a temperature variable.

BACKGROUND INFORMATION

To control and/or monitor exhaust-gas treatment systems, exact knowledge of the condition, especially of the flow condition, is necessary. This condition is determined in particular by the temperature in the exhaust-gas treatment system. However, this temperature is only accurately detectable with very great effort and expense.

SUMMARY OF THE INVENTION

Because the temperature variable is specified on the basis of other variables that characterize the condition of the combustion engine and/or of the exhaust-gas treatment system, such as the mass flow in the exhaust-gas treatment system and a second variable that characterizes the temperature upstream from the exhaust-gas treatment system, an exact determination of the mean temperature of the particle filter and/or of the exhaust downstream from the particle filter is possible.

The procedural method according to the present invention is not limited here to particle filters; it is usable with all exhaust-gas treatment systems. This also applies especially to all types of catalytic converters.

Determination of the temperature variable according to the present invention makes this variable available more quickly. Rapid recognition of the condition of the particle filter is therefore possible. In particular, the degree of loading of the particle filter, or a defect in the particle filter, is recognizable significantly more quickly. Because of the earlier recognition of the condition, more precise control, regulation and/or monitoring of the exhaust-gas treatment system is possible.

It is especially advantageous when the variable that characterizes the mass flow in the exhaust-gas treatment system is determined on the basis of an air variable that characterizes the quantity of air fed to the combustion engine, and/or a fuel variable which characterizes the mass of fuel fed to the combustion engine. That allows this variable to be determined very simply and precisely, without need of an additional sensor. The air variable is usually available in the control unit, since it is also used for controlling the combustion engine, especially the quantity of fuel injected and/or the quantity of air. This variable is usually measured using a sensor in the intake line of the combustion engine. The fuel variable is also a variable that is present in the control unit. For example, a variable derived from the desired moment and/or a variable derived from the actuating signal of a quantity-determining actuator may be used here.

Preferably, the method is used to determine the temperature of the exhaust-gas treatment system and/or the temperature of the gases downstream from the exhaust-gas treatment system.

The method according to the present invention is preferably suitable for exhaust-gas treatment systems that include at least one particle filter. At the same time, additional systems that treat the exhaust gas may be present, in addition to the particle filter.

It is especially advantageous when the temperatures determined are used only in certain conditions, for example in dynamic conditions, to control and/or regulate the exhaust-gas treatment system.

It is also advantageous when the temperature determined is used for error monitoring. Preferably, there may be provision for the measured values of the temperature to be compared with the calculated values, and for errors to be recognized on the basis of this comparison.

DETAILED DESCRIPTION

The procedural method according to the present invention is described below on the example of a particle filter. The procedural method according to the present invention is not limited here to the application with a particle filter, it is also usable with other exhaust-gas treatment systems, in catalytic converters in particular.

Figure 1:
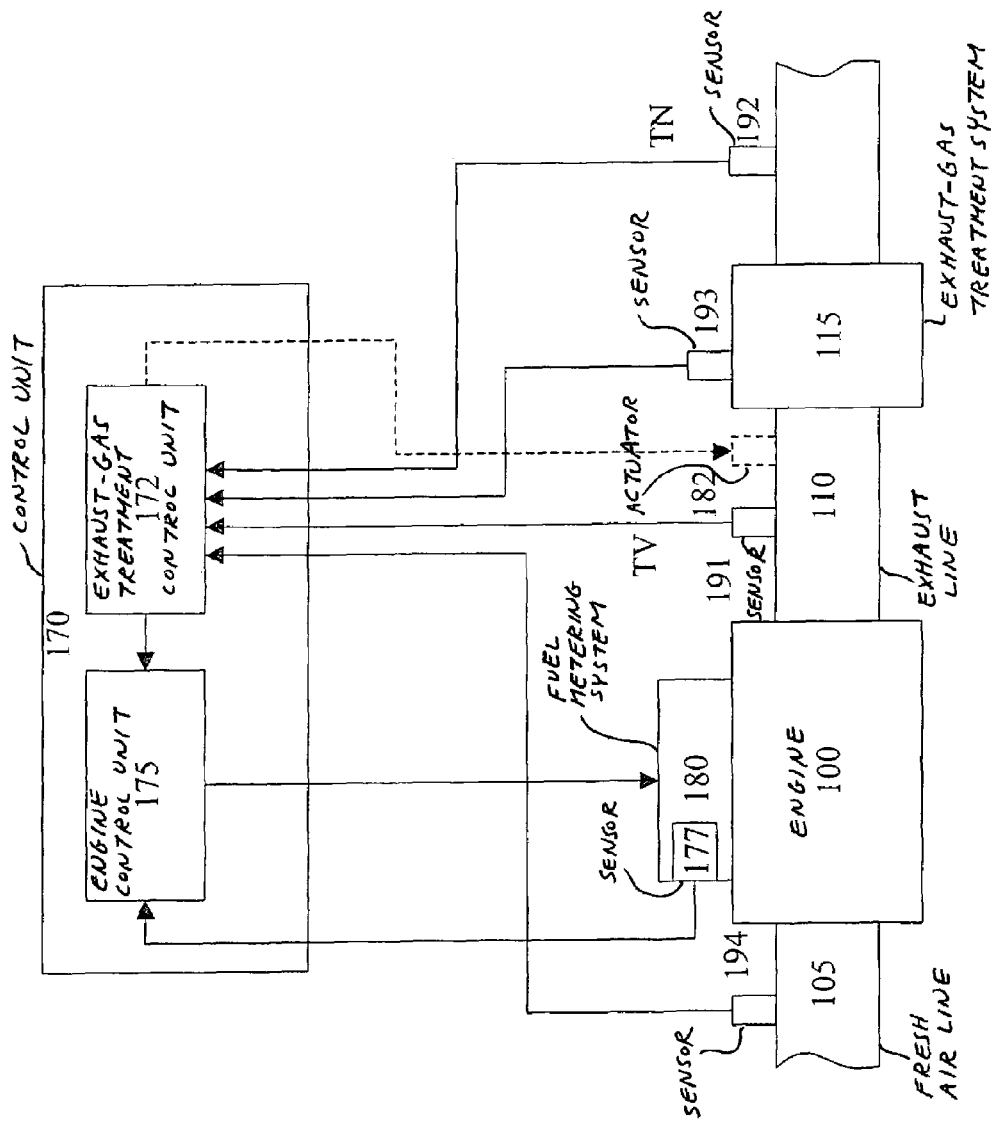
FIG. 1 shows a block diagram of an exhaust-gas treatment system.

FIG. 1 shows the essential elements of an exhaust-gas treatment system of a combustion engine 100. Fresh air is fed to it via a fresh air line 105. The exhaust gases from combustion engine 100 pass through an exhaust line 110 into the environment. An exhaust-gas treatment system 115 is positioned in the exhaust line. This may be a catalytic converter and/or a particle filter. It is also possible for a plurality of catalytic converters for different pollutants, or combinations of at least one catalytic converter and one particle filter to be provided.

Also provided is a control unit 170, which includes at least one engine control unit 175 and one exhaust-gas treatment control unit 172. Engine control unit 175 applies actuating signals to a fuel metering system 180. Exhaust-gas treatment control unit 172 applies actuating signals to engine control unit 175, and in one embodiment applies them to an actuator 182 which is positioned in the exhaust line upstream from the exhaust-gas treatment system, or in the exhaust-gas treatment system.

In addition, various sensors may be provided, which supply the exhaust-gas treatment control unit and the engine control unit with signals. For example, at least one first sensor 194 is provided, which supplies signals that characterize the condition of the air that is fed to the combustion engine. A second sensor 177 supplies signals that characterize the condition of fuel metering system 180. At least one third sensor 191 supplies signals that characterize the condition of the exhaust gas upstream from the exhaust-gas treatment system. At least one fourth sensor 193 supplies signals that characterize the condition of exhaust-gas treatment system 115.

Furthermore, at least one sensor 192 may supply signals that characterize the condition of the exhaust gases downstream from the exhaust-gas treatment system. Preferably, sensors are used that detect temperature values and/or pressure values.

In the embodiment described below, sensor 191 is constructed as a temperature sensor. This sensor supplies a signal TV which characterizes the temperature upstream from the exhaust-gas treatment system. Sensor 192 is constructed as a temperature sensor. This sensor 192 supplies a signal TN which characterizes the temperature downstream from the exhaust-gas treatment system. This signal TN may also be calculated on the basis of other variables.

The output signals of first sensor 194, third sensor 191, fourth sensor 193 and fifth sensor 192 preferably act on exhaust-gas treatment control unit 172. The output signals of second sensor 177 preferably act on engine control unit 175. Additional sensors that are not shown may also be provided, which characterize a signal referring to the driver's wish or other environmental or engine operating conditions.

It is especially advantageous when the engine control unit and the exhaust-gas treatment control unit constitute one structural unit. However, provision may also be made for them to be constructed as two control units which are spatially separated from each other.

The method according to the present invention is preferably utilized for controlling combustion engines, in particular for combustion engines having an exhaust-gas treatment system. In particular, it may be utilized with exhaust-gas treatment systems in which a catalytic converter and a particle filter are combined. It is also utilizable with systems that are equipped only with a catalytic converter.

Starting from the available sensor signals, engine controller 175 calculates actuating signals for acting on fuel metering system 180. The latter then meters the appropriate quantity of fuel to combustion engine 100. During combustion, particles may develop in the exhaust gas. These are captured by the particle filter in exhaust-gas treatment system 115. In the course of operation, corresponding quantities of particles collect in particle filter 115. This results in degradation of the functioning of the particle filter and/or of the combustion engine. For that reason there is provision for a regeneration process to be initiated at certain intervals or when the particle filter has reached a certain loading condition. This regeneration may also be referred to as special operation.

The loading condition is recognized for example on the basis of various sensor signals. First, for example, the differential pressure between the input and the output of particle filter 115 may be evaluated. Second, it is possible to determine the loading condition on the basis of various temperature variables and/or various pressure values. Furthermore, additional values may also be drawn upon to calculate or simulate the loading condition. A corresponding procedure is known for example from German Patent 199 06 287.

If the exhaust-gas treatment control unit recognizes that the particle filter has reached a certain loading condition, the regeneration is initialized. A variety of possibilities are available for regenerating the particle filter. For one example, there may be provision for certain substances to be fed to the exhaust gas via actuator 182, which then bring about a corresponding reaction in exhaust-gas treatment system 115. These additionally metered substances cause a temperature increase and/or oxidation of the particles in the particle filter, among other things. For example, there may be provision for fuel and/or oxidizing agents to be supplied via actuator 182.

In one design there may be provision for an appropriate signal to be conveyed to engine control unit 175, and for the latter to carry out a post-injection. The post-injection makes it possible to introduce hydrocarbons into the exhaust gas selectively, which contribute to regeneration of exhaust-gas treatment system 115 by increasing the temperature.

Provision is usually made for the loading condition to be determined on the basis of a variety of variables. The various conditions are recognized through comparison with a threshold value, and the regeneration is initiated depending on the recognized loading condition.

According to the present invention, the dynamic thermal behavior of the particle filter is modeled. The model of temperature TF of the particle filter is based mainly on the temperature TV of the exhaust-gas stream upstream from particle filter 115. This temperature is used for a calculation of the thermal balance of the particle filter. The balance of the streams of heat flowing in and away produces this correlation:

$$TF = (1/CPF)\int M*CPA*(TV-TN)*dt$$

Here variable $C_{PF}$ characterizes the heat capacity of the filter, and variable $C_{PA}$ represents the specific heat capacity of the exhaust mass flow. Exhaust mass flow M will preferably be calculated from other known variables, such as the air mass, which is measured using sensor 194, and fuel mass QK, which is provided by engine control unit 175. Instead of these variables, corresponding substitute variables may also be used, such as the duration of actuation of a quantity-determining actuator, or the actuating signal of a quantity-determining actuator. Variable TN corresponds to the temperature downstream from the filter. If no sensor 192 is used downstream from the exhaust-gas treatment system to determine temperature TN downstream from the exhaust gas, then temperature TN is preferably determined according to the following formula.

$$TN = TF*BF + TV*(1-BF)$$

In the first calculation, an initialization value is specified here for temperature TF. Preferably, temperature TV measured at power-up or some other temperature value is used as the starting value for this. In the next calculation, temperature TF from the preceding calculation step is used. This is possible because the temperature of the filter changes significantly more slowly than the time to calculate a program run-through. Variable BF is a variable that characterizes the part of the exhaust stream which is involved in the heat exchange with the filter. Variable 1−BF characterizes that part of the exhaust stream that passes through the filter without an exchange of heat.

Figure 2:
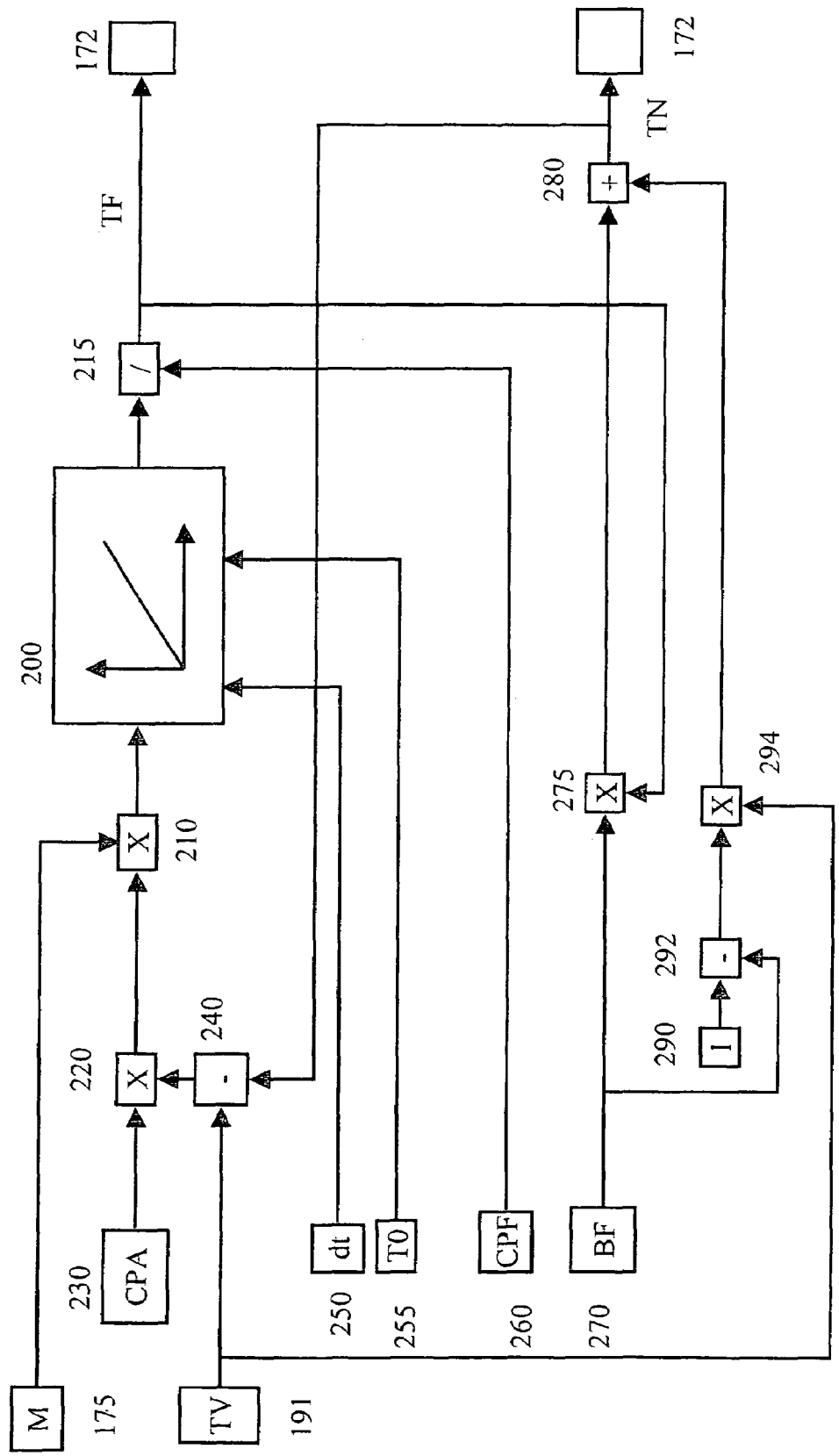
FIG. 2 shows a diagram of the procedure according to the present invention.

A corresponding procedure is shown in FIG. 2.

Elements already described in FIG. 1 are designated with the same reference symbols in FIG. 2. An integrator which essentially performs an integration of the variables according to the above formula is designated as 200. It is fed the output signal from a multiplication point 210. One of the variables present at the input to the latter is variable M, which characterizes the mass flow of exhaust leaving the combustion engine. At the second input of linkage point 210 the output signal from another multiplication point 220 is present, which feeds output signal CPA to a value specification 230. The output signal from a subtraction point 240 is applied to the second input of multiplication point 220. Applied to subtraction point 240 are both output signal TV from sensor 191 and output signal TN from a linkage point 280.

Also fed to integrator 200 are output signals dt from a value specification 250, which includes various integrator constants. Output signal T0 from a starting value specification 255, in which the starting value of the integration is stored, is also fed to integrator 200.

Integrator 200 applies a signal to a division 215, at whose second input output signal CPF from a value specification 260 which supplies signal CPF is present. Applied to the output of the division is signal TF, which characterizes the filter temperature. This is furnished to a control unit 170, and in particular to exhaust-gas treatment control unit 172. Signal TF also arrives at a multiplication 275, to whose other input signal BF from signal specification 270 is applied. The output signal from multiplication 275 acts on addition point 280. Also applied to addition point 280 is the output signal from multiplication 294, which is again applied to output signal TV from sensor 191, and the output signal from a subtraction point 292 which constitutes the difference between a constant value 1 and variable BF. The structure illustrated in FIG. 2 emulates the formulas specified above.

According to the present invention, temperature TF of the exhaust-gas treatment system or the temperature of the exhaust gases in the exhaust-gas treatment system, as well as temperature TN downstream from the exhaust-gas treatment system, are calculated on the basis of a variable that characterizes the mass flow in the exhaust-gas treatment system, and a second temperature that characterizes the temperature upstream from the exhaust-gas treatment system. The mass flow, for its part, is calculated on the basis of the air mass and of the fuel mass that are fed to the combustion engine. Instead of the air mass and the fuel mass, other variables that characterize these variables may also be used. Instead of temperature TF in the exhaust-gas treatment system and temperature TN downstream from the exhaust-gas treatment system, other temperature variables may also be determined in the corresponding manner.

According to the present invention, temperature variables TF and/or TN calculated in this way are used to control the exhaust-gas treatment system. This makes it possible for example to dispense with sensors 192, 193.

Figure 3:
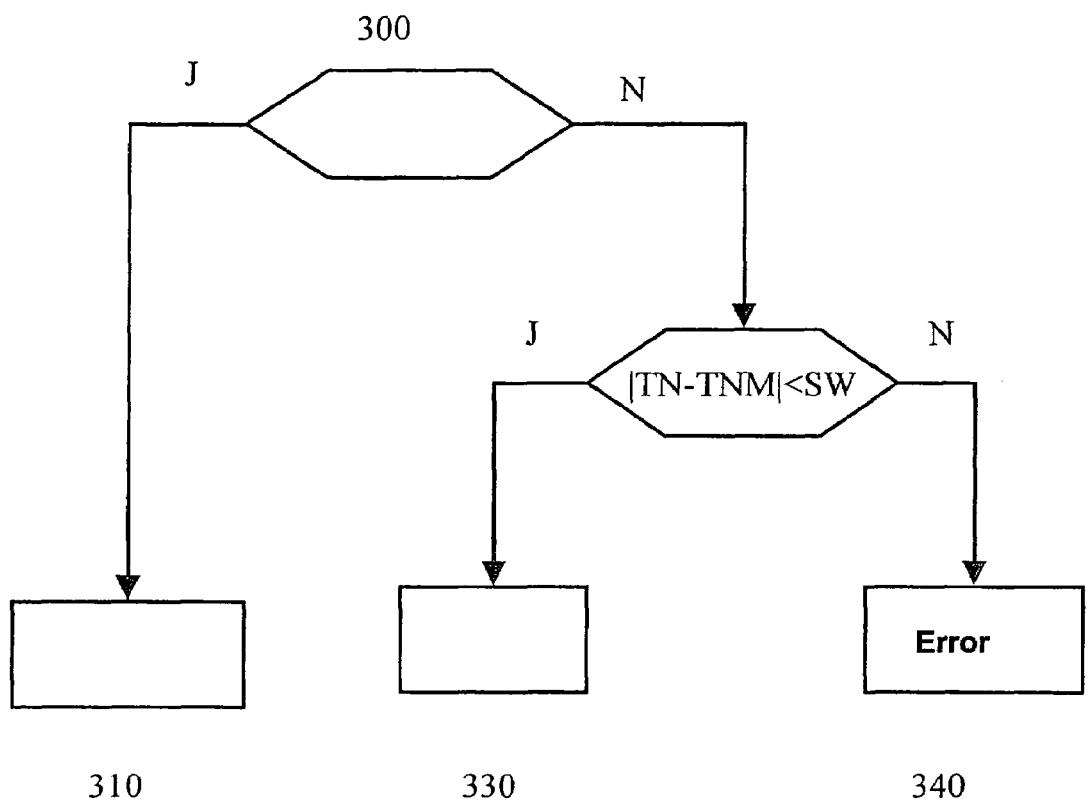
FIG. 3 shows a flow chart of the procedure.

It is especially advantageous when the calculated variables are used only in certain operating conditions. A corresponding procedure is illustrated in FIG. 3. In step 300, a check is performed to determine whether an operating condition is present in which it is appropriate to use the calculated variables instead of the measured variables. Such operating conditions are present in particular in dynamic conditions, in which certain operating parameters change quickly. For example, there may be provision for a check to be performed of whether the change of the driver's wish, of the quantity of fuel injected, the rotational speed and/or the quantity of fresh air is greater than a threshold value. If so, i.e., if such a dynamic condition is present, in step 310 the exhaust-gas treatment system is controlled as a function of the calculated temperature.

If query 300 shows that no such condition is present, then step 310 checks whether the magnitude of the difference between simulated temperatures TN and/or TF and measured temperatures TN and/or TF is smaller than a threshold value. If this is true, then the measured temperature is used in step 330 to control the combustion engine and/or the exhaust-gas treatment system. If it is not true, i.e., the measured and the simulated temperatures deviate significantly from each other, step 340 recognizes errors.

In one embodiment according to the present invention, it may also be provided that the measured temperatures are always used for controlling and the simulated ones only for error recognition.

What is claimed is:

1. A method for determining an error in temperature measurement of an exhaust-gas treatment system of a combustion engine, comprising:
 providing a first variable that characterizes an exhaust gas mass flow rate in the exhaust-gas treatment system;
 providing a second variable corresponding to a temperature that characterizes an exhaust-gas temperature upstream from the exhaust-gas treatment system;
 measuring, by a temperature sensor, at least one of a third variable corresponding to a measured temperature that characterizes the exhaust-gas treatment system and a fourth variable corresponding to a measured temperature that characterizes an exhaust gas temperature downstream from the exhaust-gas treatment system;
 calculating at least one of a fifth variable corresponding to a calculated temperature that characterizes the exhaust-gas treatment system and a sixth variable corresponding to a calculated temperature that characterizes the exhaust gas temperature downstream from the exhaust-gas treatment system, wherein the fifth variable and the sixth variable are calculated using the first variable and the second variable;
 calculating a difference between: a) one of the third variable and the fourth variable; and b) one of the fifth variable and the sixth variable;
 comparing the calculated difference with a threshold value; and
 recognizing an error when the calculated difference is greater than the threshold value.

2. The method as recited in claim 1, wherein the first variable is determined on the basis of at least one of an air variable that characterizes a quantity of air fed to the combustion engine and a fuel variable that characterizes a mass of a fuel fed to the combustion engine.

3. The method as recited in claim 1, wherein:
 the fifth variable and the sixth variable are used in a dynamic condition of the combustion engine to control the exhaust-gas treatment system.

4. The method as recited in claim 1, wherein:
 the fifth variable corresponds to a calculated temperature of a particle filter contained in the exhaust-gas treatment system.

5. The method as recited in claim 1, wherein the second variable is measured by another temperature sensor.

\* \* \* \* \*